United States Patent
An et al.

(10) Patent No.: US 12,023,650 B2
(45) Date of Patent: Jul. 2, 2024

(54) THREE-DIMENSIONALLY ORDERED MACROPOROUS OXYGEN-DEFICIENT CERIUM DIOXIDE CATALYST, AND PREPARATION METHOD AND APPLICATION THEREOF

(71) Applicant: GUANGDONG UNIVERSITY OF TECHNOLOGY, Guangdong (CN)

(72) Inventors: Taicheng An, Guangdong (CN); Jiejing Kong, Guangdong (CN); Guiying Li, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 429 days.

(21) Appl. No.: 17/311,352

(22) PCT Filed: Dec. 4, 2020

(86) PCT No.: PCT/CN2020/133946
§ 371 (c)(1),
(2) Date: Jun. 7, 2021

(87) PCT Pub. No.: WO2021/078308
PCT Pub. Date: Apr. 29, 2021

(65) Prior Publication Data
US 2022/0040675 A1 Feb. 10, 2022

(30) Foreign Application Priority Data
Oct. 23, 2019 (CN) .......................... 201911011392.0

(51) Int. Cl.
*B01J 23/10* (2006.01)
*B01J 6/00* (2006.01)
(Continued)

(52) U.S. Cl.
CPC ............... *B01J 23/10* (2013.01); *B01J 6/001* (2013.01); *B01J 8/0285* (2013.01); *B01J 35/39* (2024.01);
(Continued)

(58) Field of Classification Search
None
See application file for complete search history.

(56) References Cited

U.S. PATENT DOCUMENTS

2016/0093891 A1  3/2016  Rehman et al.

FOREIGN PATENT DOCUMENTS

CN   101199929   6/2008
CN   105214682   1/2016
(Continued)

OTHER PUBLICATIONS

Oliveira et al, solar thermochemical CO2 splitting using cork templated ceria ecoceramics, Journal of CO2 Utilization, 26, pp. 552-563 (Year: 2018).*
(Continued)

*Primary Examiner* — Stefanie J Cohen
(74) *Attorney, Agent, or Firm* — JCIPRNET

(57) ABSTRACT

The present application is related to a three-dimensionally ordered macroporous oxygen-deficient cerium dioxide catalyst, and a preparation method and an application thereof. The catalyst is prepared by using a polymethyl methacrylate (PMMA) colloidal crystal template method, calcining in a reducing/oxidizing atmosphere, and treating with water vapor, and the prepared catalyst shows an excellent activity and stability in photothermocatalytic purification of typical amospheric pollutants such as styrene, n-hexane, and cyclohexane. The method has the characteristics of cheap and easily available raw materials, simple preparation process, controllable oxygen vacancy, surface acid amount, and acid
(Continued)

strength of the obtained material, and excellent photothermocatalytic performance.

4 Claims, 1 Drawing Sheet

(51) Int. Cl.
*B01J 8/02* (2006.01)
*B01J 35/39* (2024.01)
*B01J 37/02* (2006.01)
*B01J 37/34* (2006.01)
*B01J 35/64* (2024.01)

(52) U.S. Cl.
CPC ......... *B01J 37/0201* (2013.01); *B01J 37/343* (2013.01); *B01J 35/657* (2024.01)

(56) References Cited

FOREIGN PATENT DOCUMENTS

| | | | |
|---|---|---|---|
| CN | 106622206 A | * | 5/2017 |
| CN | 108940306 | | 12/2018 |
| CN | 109319753 | | 2/2019 |
| CN | 110975857 | | 4/2020 |

OTHER PUBLICATIONS

CN-106622206-A—English translation (Year: 2017).*
"International Search Report (Form PCT/ISA/210) of PCT/CN2020/133946," dated Mar. 1, 2021, pp. 1-5.

* cited by examiner

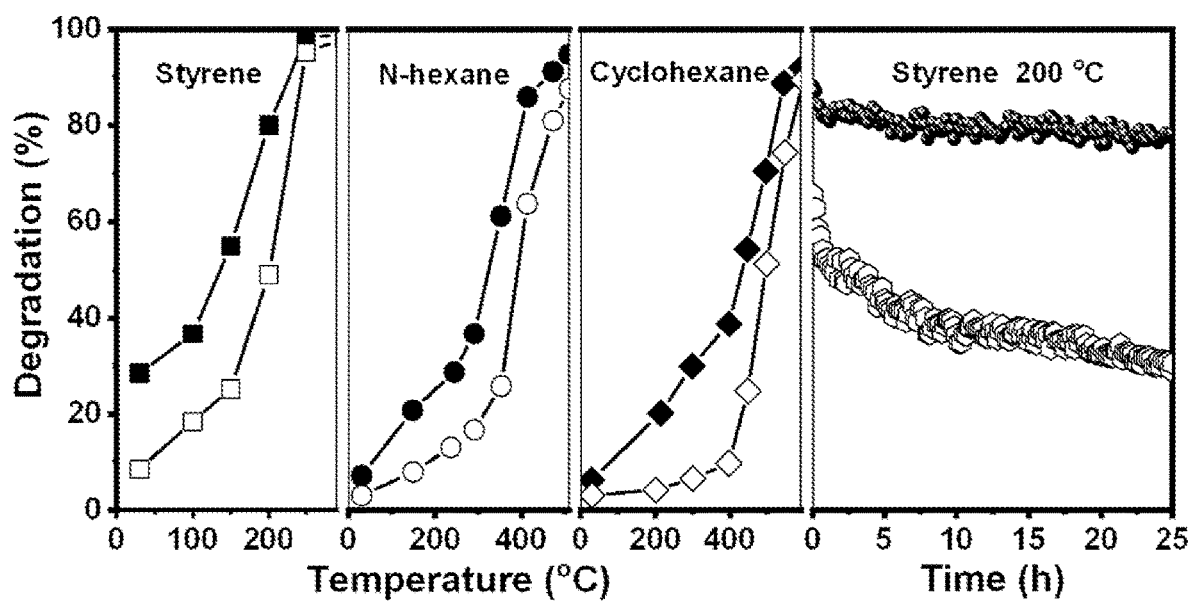

THREE-DIMENSIONALLY ORDERED MACROPOROUS OXYGEN-DEFICIENT CERIUM DIOXIDE CATALYST, AND PREPARATION METHOD AND APPLICATION THEREOF

CROSS-REFERENCE TO RELATED APPLICATION

This application is a 371 of international application of PCT application serial no. PCT/CN2020/133946, filed on Dec. 4, 2020, which claims the priority benefit of China application no. 201911011392.0, filed on Oct. 23, 2019. The entirety of each of the above-mentioned patent applications is hereby incorporated by reference herein and made a part of this specification.

BACKGROUND OF THE INVENTION

1. Technical Field

The present invention belongs to the fields of environmental catalysis and preparation of inorganic metal catalyst materials, and more particularly, relates to a three-dimensionally ordered macroporous oxygen-deficient cerium dioxide catalyst, and a preparation method and an application thereof.

2. Background of Related Art

A large number of literatures have confirmed a high efficiency of photothermocatalytic degradation of volatile organic compounds (VOCs). A core of a photothermocatalytic technology is the development of a catalyst with a high activity and a high stability. Cerium dioxide itself has unique optical properties, high oxygen release/storage capacity, and favorable thermostability, and is widely used in the field of photothermocatalysis. However, a high mineralization temperature is required during treating some refractory VOCs, such as benzene series, straight-chain alkanes, and cycloalkanes, and a large number of intermediate products are rapidly formed. The intermediate products and even deposited carbon are easy to accumulate on a catalyst surface, which leads to gradual decline in its catalytic activity, thus seriously affecting a catalytic stability of a cerium dioxide catalyst.

At present, researchers have tried various modification methods to optimize the catalytic activity and stability of the cerium dioxide, mainly focusing on morphology control, element doping, and noble metal loading. A large number of literatures have reported orderly arranged open porous channel structures with an even pore size, such as nano-tube arrays and three-dimensionally ordered macropores, which can effectively increase a contact area between the cerium dioxide and a reactant, and each porous channel may be regarded as an independent reaction site, which can limit a range of active ingredients and enrich reactant molecules at the same time. In addition, the ordered porous structure not only is conducive to heat transfer and exchange among reacting substances, but also can store incident light with a certain wavelength, reduce rapid scattering of photons, and promote a photothermocatalytic reaction. In addition, promoting generation of active oxygen is a key to improve a catalytic performance, and an oxidation-reduction performance of the cerium dioxide cannot be improved essentially by morphology control alone. Some researchers broaden a light response range of the cerium dioxide and improve a lattice oxygen migration ability of the cerium dioxide by doping elements (such as Bi, N, Mn, Co, and K), or improve an oxygen activation ability by loading noble metals with a strong oxidation activity (such as Pt and Pd). However, a structure stability of the cerium dioxide can be reduced by doping the elements, and noble metal particles are easy to be coarsened and agglomerated during reaction, resulting in problems of poor stability, large dosage of noble metal, high cost, and the like of the modified catalyst.

SUMMARY OF THE INVENTION

In order to solve the deficiencies and shortcomings in the prior art, the primary objective of the present invention lies in providing a preparation method of a three-dimensionally ordered macroporous oxygen-deficient cerium dioxide catalyst. According to the method, the prepared cerium dioxide has an even and ordered porous channel size, and is rich in oxygen vacancies and weak acid sites by regulating and controlling a morphology, an oxygen vacancy, and an acid site of the catalyst, which is beneficial for adsorption of a reactant and oxygen activation, improves a catalytic activity and a carbon deposition resistance thereof during photothermocatalysis, and solves problems of a low activity and a poor catalytic stability of a traditional cerium dioxide catalyst.

Another objective of the present invention lies in providing a three-dimensionally ordered macroporous oxygen-deficient cerium dioxide catalyst prepared by the above preparation method.

Yet another objective of the present invention lies in providing an application of the above three-dimensionally ordered macroporous oxygen-deficient cerium dioxide catalyst.

The objectives of the present invention are achieved by the following technical solutions.

A preparation method of a three-dimensionally ordered macroporous oxygen-deficient cerium dioxide catalyst includes following steps of:

S1: adding cerium nitrate hexahydrate and citric acid monohydrate powder into an alcohol solution to obtain an even transparent solution A after ultrasonic treatment;

S2: immersing polymethyl methacrylate (PMMA) microsphere powder in the solution A, carrying out ultrasonic homogenization, then removing excess liquid by suction filtration to obtain a solid B, and sequentially carrying out vacuum drying, calcination I, and calcination II on the solid B to obtain a solid C; and S3: transferring the solid C obtained in the step S2 into a fixed bed reactor, and then carrying out calcination III, water vapor treatment, and calcination IV to obtain the three-dimensionally ordered macroporous oxygen-deficient cerium dioxide catalyst;

wherein the calcination III and the water vapor treatment in the step S3 are carried out at the same time, and include processes of: controlling a humidity in the reactor to be 10% to 90% by using a nitrogen bubbling device, and calcinating at 200° C. to 600° C. for 1 hour to 24 hours in a mixed gas atmosphere of hydrogen and nitrogen with a volume ratio of 1:0.1 to 1:10; and the calcination IV includes a process of: introducing nitrogen for blowing for 1 hour at a temperature of the calcination III, and calcining at 200° C. to 600° C. for 1 hour to 24 hours in a mixed gas atmosphere of air and nitrogen with a volume ratio of 1:0.1 to 1:10.

The alcohol solution in the step S1 is a mixed solution of ethylene glycol and methyl alcohol, or ethyl alcohol, and a volume ratio of the ethylene glycol to the methyl alcohol in the mixed solution of ethylene glycol and methyl alcohol is 1:0.1 to 1:10; and a molar ratio of the cerium nitrate hexahydrate to citric acid monohydrate powder is 1:0.1 to 1:10.

A ratio of a total mass of the cerium nitrate hexahydrate and citric acid monohydrate to a volume of the alcohol solution in the step S1 is 0.9 g·mL$^{-1}$ to 1.1 g·mL$^{-1}$.

A diameter of the polymethyl methacrylate microsphere in the step S2 is 50 nm to 500 nm; a mass volume ratio of the polymethyl methacrylate microsphere to the solution A is 0.25 g·mL$^{-1}$ to 0.3 g·mL$^{-1}$; the vacuum drying is carried out at 30° C. to 80° C. for 1 hour to 100 hours; the calcination I and the calcination II are carried out in a tubular furnace, wherein the calcination I includes a process of: calcinating at 100° C. to 1,000° C. for 1 hour to 36 hours in an argon atmosphere, and the calcination II includes a process of: calcinating at 300° C. to 1,000° C. for 1 hour to 36 hours in an air atmosphere.

A three-dimensionally ordered macroporous oxygen-deficient cerium dioxide catalyst prepared by the above preparation method is provided.

An application of the above three-dimensionally ordered macroporous oxygen-deficient cerium dioxide catalyst in photothermocatalytic degradation of styrene, n-hexane, and cyclohexane is provided.

Compared with the prior art, the present invention has the following advantages and beneficial effects.

(1) According to the present invention, an oxygen vacancy concentration of the cerium dioxide catalyst is regulated and controlled, and an oxidation-reduction performance thereof is improved.

(2) According to the present invention, a surface acid amount and an acid strength of the cerium dioxide catalyst are regulated and controlled, and a carbon deposition resistance thereof is improved.

(3) The three-dimensionally ordered macroporous oxygen-deficient cerium dioxide catalyst of the present invention shows good photothermocatalytic activity and stability.

(4) According to the present invention, raw materials are cheap and easily available, a preparation process is simple, and a cost is low.

BRIEF DESCRIPTION OF THE DRAWING

FIG. 1 is a photothermocatalytic degradation curve and stability test diagram of gas-phase styrene, n-hexane, and cyclohexane by a three-dimensionally ordered macroporous oxygen-deficient cerium dioxide catalyst, wherein a solid marking pattern refers to a three-dimensionally ordered macroporous oxygen-deficient cerium dioxide catalyst 1, and a hollow marking pattern refers to a three-dimensionally ordered macroporous cerium dioxide catalyst 1.

DESCRIPTION OF THE EMBODIMENTS

The present invention is further described hereinafter by the specific embodiments, but the specific embodiments do not limit the present invention. Those skilled in the art can make various modifications or improvements according to the basic idea of the present invention, but the modifications or improvements are all included in the scope of the present invention as long as they do not deviate from the basic idea of the present invention. Unless otherwise specified, the technical means used in the embodiments are conventional means well known to those skilled in the art. Unless otherwise specified, reagents, methods, and devices adopted in the present invention are conventional reagents, methods, and devices in the technical field.

Embodiment 1

In S1, equimolar (2 mmol) cerium nitrate hexahydrate and citric acid monohydrate powder were put into a glass beaker, and added with 1.2 mL of alcohol solution (a volume ratio of ethylene glycol to methyl alcohol was 1:1) to obtain an even transparent solution A after ultrasonic treatment at a room temperature for 1 hour.

In S2, 0.5 g of PMMA microsphere powder (with a diameter of 300 nm) was immersed in the solution A, ultrasonically mixed for 5 minutes, stood for 12 hours in a dark place, and filtered in vacuum with a sand core filter to remove excess liquid to obtain a solid B. The solid B was dried in vacuum at 60° C. for 12 hours, then transferred into a tubular furnace, calcined at 130° C. for 1 hour under an argon atmosphere, heated to 600° C. at a rate of 1° C.·min$^{-1}$, calcined at 600° C. for 5 hours, and then calcined at 600° C. for 3 hours in air to obtain a solid C.

In S3, the obtained solid C was transferred into a fixed bed reactor, a humidity in the reactor was controlled to be 30% by adopting a nitrogen bubbling device, and calcination was carried out at 400° C. for 2 hours in a mixed gas atmosphere of hydrogen and nitrogen (a volume ratio of the hydrogen to the nitrogen was 1:1). Then, dehumidification was carried out by introducing the nitrogen for blowing at 400° C. for 1 hour, and then calcination was carried out at 400° C. for 2 hours in a mixed gas atmosphere of air and nitrogen (a volume ratio of the air to the nitrogen was 1:1) to obtain a three-dimensionally ordered macroporous oxygen-deficient cerium dioxide catalyst 1.

Embodiment 2

In S1, 2 mmol cerium nitrate hexahydrate and 8 mmol citric acid monohydrate powder were put into a glass beaker, and added with 2.5 mL of alcohol solution (a volume ratio of ethylene glycol to methyl alcohol was 1:5) to obtain an even transparent solution A after ultrasonic treatment at a room temperature for 0.5 hour.

In S2, 1 g of PMMA microsphere powder (with a diameter of 200 nm) was immersed in the solution A, ultrasonically mixed for 5 minutes, stood for 24 hours in a dark place, and filtered in vacuum with a sand core filter to remove excess liquid to obtain a solid B. The solid B was dried in vacuum at 30° C. for 96 hours, then transferred into a tubular furnace, calcined at 100° C. for 3 hours under an argon atmosphere, heated to 400° C. at a rate of 5° C.·min$^{-1}$, calcined at 400° C. for 36 hours, and then calcined at 400° C. for 36 hours in air to obtain a solid C.

In S3, the obtained solid C was transferred into a fixed bed reactor, a humidity in the reactor was controlled to be 80% by adopting a nitrogen bubbling device, and calcination was carried out at 400° C. for 10 hours in a mixed gas atmosphere of hydrogen and nitrogen (a volume ratio of the hydrogen to the nitrogen was 1:8). Then, dehumidification was carried out by introducing the nitrogen for blowing at 400° C. for 1 hour, and then calcination was carried out at 400° C. for 10 hours in a mixed gas atmosphere of air and nitrogen (a volume ratio of the air to the nitrogen was 1:8)

to obtain a three-dimensionally ordered macroporous oxygen-deficient cerium dioxide catalyst 2.

Embodiment 3

In S1, 2 mmol cerium nitrate hexahydrate and 0.5 mmol citric acid monohydrate powder were put into a glass beaker, and added with 1 mL of ethanol solution to obtain an even transparent solution A after ultrasonic treatment at a room temperature for 0.5 hour.

In S2, 0.4 g of PMMA microsphere powder (with a diameter of 500 nm) was immersed in the solution A, ultrasonically mixed for 5 minutes, stood for 8 hours in a dark place, and filtered in vacuum with a sand core filter to remove excess liquid to obtain a solid B. The solid B was dried in vacuum at 80° C. for 1 hour, then transferred into a tubular furnace, calcined at 130° C. for 1 hour under an argon atmosphere, heated to 800° C. at a rate of 5° C.·min$^{-1}$, calcined at 800° C. for 2 hours, and then calcined at 800° C. for 6 hours in air to obtain a solid C.

In S3, the obtained solid C was transferred into a fixed bed reactor, a humidity in the reactor was controlled to be 20% by adopting a nitrogen bubbling device, and calcination was carried out at 600° C. for 1 hour in a mixed gas atmosphere of hydrogen and nitrogen (a volume ratio of the hydrogen to the nitrogen was 1:0.5). Then, dehumidification was carried out by introducing the nitrogen for blowing at 600° C. for 1 hour, and then calcination was carried out at 600° C. for 1 hour in a mixed gas atmosphere of air and nitrogen (a volume ratio of the air to the nitrogen was 1:0.5) to obtain a three-dimensionally ordered macroporous oxygen-deficient cerium dioxide catalyst 3.

Embodiment 4

In S1, 2 mmol cerium nitrate hexahydrate and 16 mmol citric acid monohydrate powder were put into a glass beaker, and added with 4 mL of alcohol solution (a volume ratio of ethylene glycol to methyl alcohol was 1:0.5) to obtain an even transparent solution A after ultrasonic treatment at a room temperature for 2 hours.

In S2, 1.5 g of PMMA microsphere powder (with a diameter of 400 nm) was immersed in the solution A, ultrasonically mixed for 5 minutes, stood for 24 hours in a dark place, and filtered in vacuum with a sand core filter to remove excess liquid to obtain a solid B. The solid B was dried in vacuum at 60° C. for 36 hours, then transferred into a tubular furnace, calcined at 150° C. for 1 hour under an argon atmosphere, heated to 900° C. at a rate of 1° C.·min$^{-1}$, calcined at 900° C. for 1 hour, and then calcined at 900° C. for 1 hour in air to obtain a solid C.

In S3, the obtained solid C was transferred into a fixed bed reactor, a humidity in the reactor was controlled to be 60% by adopting a nitrogen bubbling device, and calcination was carried out at 600° C. for 5 hours in a mixed gas atmosphere of hydrogen and nitrogen (a volume ratio of the hydrogen to the nitrogen was 1:5). Then, dehumidification was carried out by introducing the nitrogen for blowing at 600° C. for 1 hour, and then calcination was carried out at 600° C. for 5 hours in a mixed gas atmosphere of air and nitrogen (a volume ratio of the air to the nitrogen was 1:5) to obtain a three-dimensionally ordered macroporous oxygen-deficient cerium dioxide catalyst 4.

Embodiment 5

In S1, 2 mmol cerium nitrate hexahydrate and 1 mmol citric acid monohydrate powder were put into a glass beaker, and added with 1 mL of alcohol solution (a volume ratio of ethylene glycol to methyl alcohol was 1:0.8) to obtain an even transparent solution A after ultrasonic treatment at a room temperature for 1 hour.

In S2, 0.4 g of PMMA microsphere powder (with a diameter of 50 nm) was immersed in the solution A, ultrasonically mixed for 5 minutes, stood for 24 hours in a dark place, and filtered in vacuum with a sand core filter to remove excess liquid to obtain a solid B. The solid B was dried in vacuum at 70° C. for 6 hours, then transferred into a tubular furnace, calcined at 150° C. for 2 hours under an argon atmosphere, heated to 500° C. at a rate of 1° C.·min$^{-1}$, calcined at 500° C. for 24 hours, and then calcined at 500° C. for 36 hours in air to obtain a solid C.

In S3, the obtained solid C was transferred into a fixed bed reactor, a humidity in the reactor was controlled to be 50% by adopting a nitrogen bubbling device, and calcination was carried out at 200° C. for 24 hours in a mixed gas atmosphere of hydrogen and nitrogen (a volume ratio of the hydrogen to the nitrogen was 1:0.1). Then, dehumidification was carried out by introducing the nitrogen for blowing at 200° C. for 1 hour, and then calcination was carried out at 200° C. for 24 hours in a mixed gas atmosphere of air and nitrogen (a volume ratio of the air to the nitrogen was 1:0.1) to obtain a three-dimensionally ordered macroporous oxygen-deficient cerium dioxide catalyst 5.

Comparative Example 1

In S1, equimolar (2 mmol) cerium nitrate hexahydrate and citric acid monohydrate powder were put into a glass beaker, and added with 1.2 mL of alcohol solution (a volume ratio of ethylene glycol to methyl alcohol was 1:1) to obtain an even transparent solution A after ultrasonic treatment at a room temperature for 1 hour.

In S2, 0.5 g of PMMA microsphere powder (with a diameter of 300 nm) was immersed in the solution A, ultrasonically mixed for 5 minutes, stood for 12 hours in a dark place, and filtered in vacuum with a sand core filter to remove excess liquid to obtain a solid B. The solid B was dried in vacuum at 60° C. for 12 hours, then transferred into a tubular furnace, calcined at 130° C. for 1 hour under an argon atmosphere, heated to 600° C. at a rate of 1° C.·min$^{-1}$, calcined at 600° C. for 5 hours, and then calcined at 600° C. for 3 hours in air to obtain a solid C.

In S3, the obtained solid C was transferred into a fixed bed reactor, calcined at 200° C. for 3 hours under a nitrogen atmosphere, and then calcined at 400° C. for 2 hours in a mixed gas atmosphere of air and nitrogen (a volume ratio of the air to the nitrogen was 1:1) to obtain a three-dimensionally ordered macroporous cerium dioxide catalyst 1.

Experimental Example 1

A photothermocatalytic degradation curve and stability test diagram of gas-phase styrene, n-hexane, and cyclohexane by a three-dimensionally ordered macroporous oxygen-deficient cerium dioxide catalyst prepared by the present invention was provided.

Experimental method: a photothermocatalytic performance of the catalyst was characterized by a photo-thermal fixed bed reactor (one side of the reactor was provided with a small window through which light could irradiate). (1) Activity test method: 100 mg of catalyst was filled into a quartz reaction tube with an inner diameter of 6 mm, a temperature was controlled by a thermocouple, and an experiment was carried out at 30° C. to 600° C. Styrene, n-hexane, and cyclohexane vapor was generated by an $N_2$ bubbling device, diluted to 50 ppm with dry air, and then introduced into the reaction tube. A total gas flow rate was 50 mL·min$^{-1}$, and a space velocity was 30,000 mL·h$^{-1}$·g$^{-1}$. After the catalyst was adsorbed at a room temperature for 24 hours without light to reach an adsorption-desorption balance, a 300 W xenon lamp ($\lambda$=300 nm to 780 nm, a light intensity of 200 mw·cm$^{-2}$) was turned on, and heating was carried out for a photothermocatalytic reaction. Reaction tail gas was introduced into a gas chromatography (GC9800, FID) for on-line analysis of a concentration of VOCs. During the experiment, three data points were taken for each temperature, and a sampling time interval of each temperature point was at least more than 15 minutes, that was, a bed temperature was stable, so that a measurement data error was kept within 10% each time. (2) Stability test method: after the catalyst was adsorbed at a room temperature for 24 hours without light to reach an adsorption-desorption balance, a 300 W xenon lamp ($\lambda$=300 nm to 780 nm, a light intensity of 200 mw·cm$^{-2}$) was turned on, a photo-thermal fixed bed reactor was heated to 200° C., then a concentration of the styrene was measured online by a gas chromatography (GC9800, FID), and sampling analysis were carried out every 10 minutes.

Experimental result: FIG. 1 is the photothermocatalytic degradation curve and stability test diagram of the gas-phase styrene, n-hexane, and cyclohexane by the three-dimensionally ordered macroporous oxygen-deficient cerium dioxide catalyst. The catalyst is prepared by the method in Embodiment 1, and a catalytic performance thereof is compared with that of the three-dimensionally ordered macroporous cerium dioxide catalyst 1 in Comparative Example 1. It is found from TEM and XRD characterizations that morphologies and structures of the two catalysts are consistent. Raman and EPR confirm that the catalyst in Embodiment 1 is rich in oxygen vacancies, and compared with the catalyst in Comparative Example 1, a surface acid amount of the catalyst in Embodiment 1 is increased but an acid strength thereof is decreased ($NH_3$-TPD characterization). It can be seen from FIG. 1 that compared with the catalyst in Comparative Example 1, the catalyst in Embodiment 1 shows better photothermocatalytic activity and stability, and a degradation result shows that under illumination ($\lambda$=300 nm to 780 nm, a light intensity of 200 mw·cm$^{-2}$), temperatures of complete degradation (>95%) of the styrene, the n-hexane, and the cyclohexane are respectively 250° C., 510° C., and 590° C. A degradation rate of the styrene is kept above 75% within reaction of 25 hours of the catalyst in Embodiment 1 under a photothermocatalytic condition at 200° C., while the catalytic performance of the catalyst in Comparative Example 1 is decreased by 50% after reaction for 25 hours, which indicates that oxidation-reduction performance as well as stability of the catalyst can be effectively improved under a synergistic action of a three-dimensionally ordered macroporous structure, an oxygen vacancy, and an acid site of the cerium dioxide catalyst.

The above embodiments are the preferred embodiments of the present invention, but the embodiments of the present invention are not limited by the above embodiments. Any other changes, modifications, substitutions, combinations, and simplifications made without departing from the spirit and principle of the present invention should be equivalent substitute modes, and should be included in the scope of protection of the present invention.

What is claimed is:

1. A preparation method of a three-dimensionally ordered macroporous oxygen-deficient cerium dioxide catalyst, comprising following steps of:
   S1: adding cerium nitrate hexahydrate and citric acid monohydrate powder into an alcohol solution to obtain an even transparent solution A after ultrasonic treatment;
   S2: immersing polymethyl methacrylate microsphere powder in the solution A, carrying out ultrasonic homogenization, then removing excess liquid by suction filtration to obtain a solid B, and sequentially carrying out vacuum drying, calcination I, and calcination II on the solid B to obtain a solid C; and
   S3: transferring the solid C obtained in the step S2 into a fixed bed reactor, and then carrying out calcination III, water vapor treatment, and calcination IV to obtain the three-dimensionally ordered macroporous oxygen-deficient cerium dioxide catalyst;
   wherein the calcination III and the water vapor treatment in the step S3 are carried out at the same time, and comprise processes of: controlling a humidity in the reactor to be 10% to 90% by using a nitrogen bubbling device, and calcinating at 200° C. to 600° C. for 1 hour to 24 hours in a mixed gas atmosphere of hydrogen and nitrogen with a volume ratio of 1:0.1 to 1:10; and the calcination IV comprises a process of: introducing nitrogen for blowing for 1 hour at a temperature of the calcination III, and calcining at 200° C. to 600° C. for 1 hour to 24 hours in a mixed gas atmosphere of air and nitrogen with a volume ratio of 1:0.1 to 1:10.

2. The preparation method according to claim 1, wherein the alcohol solution in the step S1 is a mixed solution of ethylene glycol and methyl alcohol, or ethyl alcohol, and a volume ratio of the ethylene glycol to the methyl alcohol in the mixed solution of ethylene glycol and methyl alcohol is 1:0.1 to 1:10; and a molar ratio of the cerium nitrate hexahydrate to citric acid monohydrate powder is 1:0.1 to 1:10.

3. The preparation method according to claim 1, wherein a ratio of a total mass of the cerium nitrate hexahydrate and citric acid monohydrate to a volume of the alcohol solution in the step S1 is 0.9 g·mL$^{-1}$ to 1.1 g·mL$^{-1}$.

4. The preparation method according to claim 1, wherein a diameter of the polymethyl methacrylate microsphere in the step S2 is 50 nm to 500 nm; a mass volume ratio of the polymethyl methacrylate microsphere to the solution A is 0.25 g·mL$^{-1}$ to 0.3 g·mL$^{-1}$; the vacuum drying is carried out at 30° C. to 80° C. for 1 hour to 100 hours; the calcination I and the calcination II are carried out in a tubular furnace, wherein the calcination I comprises a process of: calcinating at 100° C. to 1,000° C. for 1 hour to 36 hours in an argon atmosphere, and the calcination II comprises a process of: calcinating at 300° C. to 1,000° C. for 1 hour to 36 hours in an air atmosphere.

* * * * *